(12) United States Patent
Asanuma

(10) Patent No.: US 6,658,072 B1
(45) Date of Patent: Dec. 2, 2003

(54) DIGITAL COMMUNICATION SYSTEM TRANSMITTING AND RECEIVING DEVICES THEREFOR AND FRAME SYNCHRONIZATION DETECTION CIRCUIT

(75) Inventor: Yutaka Asanuma, Yokohama (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/558,098

(22) Filed: Apr. 25, 2000

Related U.S. Application Data

(63) Continuation of application No. PCT/JP99/04583, filed on Aug. 25, 1999.

(30) Foreign Application Priority Data

| Aug. 28, 1998 | (JP) | ............ 10-243947 |
| Oct. 21, 1998 | (JP) | ............ 10-299800 |
| Nov. 4, 1998 | (JP) | ............ 10-313400 |

(51) Int. Cl.$^7$ ................................................. H04L 7/00
(52) U.S. Cl. ...................... 375/368; 375/366; 375/365
(58) Field of Search ........................... 375/368, 354, 375/364, 365, 366; 370/503, 509, 511, 514, 513

(56) References Cited

U.S. PATENT DOCUMENTS

| 3,823,266 A | * | 7/1974 | Van Elk et al. | ............ 375/357 |
| 4,688,218 A | * | 8/1987 | Blineau et al. | ............ 370/513 |
| 5,388,126 A | * | 2/1995 | Rypinski et al. | ............ 375/364 |

OTHER PUBLICATIONS

Barker, R.H., "Group Synchronizing of Binary Digital Systems," Multiple Access Communications, Foundations for Emerging Technologies, IEEE Information Theory Society, The Institute of Electrical and Electronics Engineers, Inc., pps. 86–97, New York (1993).

S. Tachikawa et al., "Nonlinear Code Sequence for Rapid Acquisition", Electronic Information Communications Society, Technical Research Report by Study Group II, Spectral Diffusion Communication, vol. 1, No. 1, (1987).

R.C. Dixon, "The Lastest Method of Spectral Diffusion Communication", Technology Series, Spread Spectrum Systems, pp. 204–205, (1978).

* cited by examiner

*Primary Examiner*—Mohammad H. Ghayour
(74) *Attorney, Agent, or Firm*—Finnegan, Henderson, Farabow, Garrett & Dunner, L.L.P.

(57) ABSTRACT

In the transmission device, a synchronization pattern made by arranging a predetermined basic pattern consisting of a combination of a predetermined number of symbols and a reversal basic pattern made by reversing a polarity of each symbol of the basic pattern, in the order according to a reversal pattern, is generated, and transmission data obtained by adding thus obtained synchronization pattern at predetermined timing is transmitted. In the reception device, the basic pattern and reversal basic pattern in the synchronization pattern are correlated with each other by a matched filter (11) corresponding to the basic pattern, and the correlation of the reversal pattern which appears in a signal obtained as a result, is taken by a matched filter consisting of delay portions (12), multipliers (13) and an adder (14).

30 Claims, 5 Drawing Sheets

DIGITAL COMMUNICATION SYSTEM TRANSMITTING AND RECEIVING DEVICES THEREFOR AND FRAME SYNCHRONIZATION DETECTION CIRCUIT

CROSS REFERENCE TO RELATED APPLICATIONS

This is a continuation of application Ser. No. PCT/JP99/04583, filed Aug. 25, 1999.

This application is based upon and claims the benefit of priority from the prior Japanese Patent Applications No. 10-243947, filed Aug. 28, 1998; No. 10-299800, filed Oct. 21, 1998; and No. 10-313400, filed Nov. 4, 1998, the entire contents of which are incorporated herein by reference.

BACKGROUND OF THE INVENTION

The present invention relates to a digital communication system for transmitting transmission data of a frame structure, such as a mobile communication system which employs a code division multiple access (CDMA), transmitting and receiving devices for the system, and a frame synchronization detection circuit.

In digital communications, a frame structure which creates one block for every certain time period is frequently used for the purpose of error detection, the use of correction symbol, multiplication of time of control signal and the like.

In this case, it is necessary to take a frame synchronization between transmission and reception of signals. For the frame synchronization, conventionally, a known synchronization pattern is inserted in advance at a head of each frame as shown in FIG. 10 on a transmission side, and the synchronization pattern is detected on a reception side.

The detection of the synchronization pattern on the reception side, can be realized by taking a correlation between a reception data and a synchronization pattern prepared on the reception side. This process is done by the matched filter.

A matched filter generally has a structure of a transverse filter such as shown in FIG. 11, and has taps of the same number as that the symbol number (represented by h in Example shown in FIG. 10) which constitutes the synchronization pattern. A g-number (g=h−1) of delay portions 20 (20-1 to 20-g) are arranged respectively between the taps, and the delay time of these is the same as the chip cycle. Further, multipliers 21 (21-1 to 21-h) are connected respectively to the taps, and coefficients corresponding to the symbols P ($P_0$ to $P_{h-1}$) of the synchronization pattern are respectively multiplied. The outputs from the multipliers 21 are added up by an adder 22, thus obtaining a detection output.

The detection output obtained by such a matched filter has a waveform, for example, as shown in FIG. 12.

Here, a significantly high level of the detection output indicates all of the symbols of a synchronization pattern are appearing in the taps, which is the timing by which the synchronization pattern was detected. Therefore, the incoming timing of the synchronization pattern, that is, a frame timing is detected.

In order to enhance the detection accuracy of the frame timing in such a method, it suffices only if the number of symbols of the synchronization pattern should be increased.

However, if the number of symbols is increased, the number of taps of a matched filter, required to take the correlation is increased, thus increasing the size of the circuit of the matched filter, as well as the consumption current.

Under these circumstances, the following method has been proposed so as to increase the number of symbols of the synchronization pattern without increasing the number of taps.

According to this method, as shown in FIG. 13, a basic pattern PA consisting of symbols ($Sa_0$ to $Sa_{m-1}$) of a symbol number (m symbols) which is less than a symbol number necessary as a synchronization pattern, is repeated for an integer number of times (n times), and thus a synchronization pattern of a necessary length (m×n symbols) is formed.

For the synchronization detection based on the synchronization pattern thus formed, a synchronization detection circuit such as shown in FIG. 14 is used.

That is, first, a matched filter 11 corresponding to the basic pattern PA is used, and the basic pattern PA is detected. Therefore, when m=4, for example, the output from the matched filter 11 will take a waveform as shown in FIG. 15. A waveform in which four peaks are created at a cycle period Tr of the basic pattern PA, is created.

Here, while output signals from the matched filter 11 are delayed by a k-number (k=n−1) of delay units 12 (12-1 to 12-k) connected in series, each by the cycle period Tr of the basic pattern, the outputs from the matched filter 11 and the outputs from the delay portions 12 are added up by the adder 14.

With this operation, the level of the outputs from the adder 14, that is, the detection outputs, peaks at the timing of all of four peaks having such as a waveform as shown in, for example, FIG. 15, being input to the adder 14, and therefore the synchronization can be detected.

Here, the number of taps necessary for the matched filter 11 is m, which is the same number as that of symbols of the basic pattern PA, whereas the number of taps necessary for a matched filter constituted by the delay portions 12 and the adder 14 is n. Therefore, the detection of a synchronization pattern of m×n symbols can be achieved with the (m+n) number of taps.

However, with this method, even if a pattern having a small correlation in different positions is used as a basic pattern PA, this basic pattern is repeated so as to generate a large correlation at positions where time axes deviate. Consequently, the detection output will take a waveform having a plurality of peaks P11 to P17 as shown in FIG. 16.

Of these peaks, the timing of the peak P11 which is at the maximum level, becomes a detection timing for the synchronization pattern; however since the level difference as compared to the other peaks is small, the detection efficiency will not very much be improved.

BRIEF SUMMARY OF THE INVENTION

The object of the present invention is to provide a digital communication system capable of performing a synchronization detection at high accuracy with a simple structure, a reception device and a frame synchronization detection circuit.

In order to achieve the above-described object, there is provided, according to the present invention, a digital communication system having a transmission device: comprising synchronization pattern generating means consisting of, for example, a basic pattern memory portion and a synchronization pattern generating portion, for generating a synchronization pattern which is made by arranging a predetermined basic pattern consisting of a combination of a predetermined number of symbols and a reversal basic pattern made by reversing a polarity of each symbol of the basic pattern, in an order according to a predetermined reversal pattern which is a combination of a predetermined number of reversal presence data indicating a non-reversal position and a reversal position, and framing means such as a frame forming section, for sectionalizing transmission data and adding the synchronization pattern generated by the synchronization pattern generating means, thereby structuralizing the transmission data in a frame.

The reception device includes a frame synchronization detection circuit consisting of a first matched filter having taps in a same number as the number of symbols contained in the basic pattern and taps in a same number as the number of focused symbols set at least a part of the symbols contained in the basis pattern, in which a delay time between taps is the same as the time between the focused symbols, and a tap coefficient is set in accordance with the focused symbols, and a second matched filter having tap in a same number of the number of basic patterns and reversal basic patterns contained in the synchronization pattern, in which a delay time between taps is the same as an arrangement cycle of the basic pattern and the reversal basic pattern in the basic pattern, and either one of two predetermined values having different polarities from each other is set as the tap coefficient to correspond to the reversal pattern, which are connected in series.

As a result, the frame position of the transmission data is indicated by a synchronization pattern obtained by arranging a predetermined basic pattern consisting of a combination of a predetermined number of symbols and a reversal basic pattern made by reversing a polarity of each symbol of the basic pattern, in an order according to a predetermined reversal pattern which is a predetermined reversal pattern.

In the reception device, the frame synchronization is performed by detecting the synchronization pattern. A process of taking a correlation of focused symbols of the basic pattern and reversal basic pattern, performed by the first matched filter in accordance with the focused symbols of the basic pattern, and a process of taking a correlation of a reversal basic pattern, performed by the second matched filter in accordance with the reversal pattern are carried out in series one after another, and thus the synchronization pattern is detected.

The reversal pattern is a combination of two types of reversal presence data of different polarities from each other, and therefore when the reversal patterns do not match with those in the second matched filter, reversal presence data cancel out with each other, to reduce the output level of the second matched filter.

According to the present invention, where the number of reversal presence data contained in the reversal pattern is n, a pattern of a combination of By (y=0, 1, ..., n−2, n−1), that is, for example {−1, 1, 1, 1}, which makes the following formula minimum, is selected, $$\text{Max}\left\{\left|\sum_{y=0}^{n-1} B_y \cdot B_{y+1}\right| (i = 1, 2 \ldots, n-2)\right\}$$

when y+i≧n, $B_y+i=0$.

As a result, while all of the reversal patterns are not present in the second matched filter, the output level of the second matched filter is suppressed to minimum.

Further, a synchronization pattern transmitted by the transmission device of the present invention is detected by a frame synchronization detection circuit consisting of a matched filter having taps in a same number as the number of focused symbols contained in the synchronization pattern set as a part of the symbols contained in the basis pattern, in which a delay time between taps is the same as the time between the focused symbols, and a tap coefficient is set in accordance with the focused symbols, and a matched filter having tap in a same number of the number of symbols contained in the synchronization pattern, in which a delay time between taps is the same as a cycle of the symbol, and the tap coefficient is set to correspond to the basic pattern.

Therefore, with the conventional frame synchronization detection circuit, the synchronization pattern can be detected.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will now be described with reference to accompanying drawings.

Figure 1:
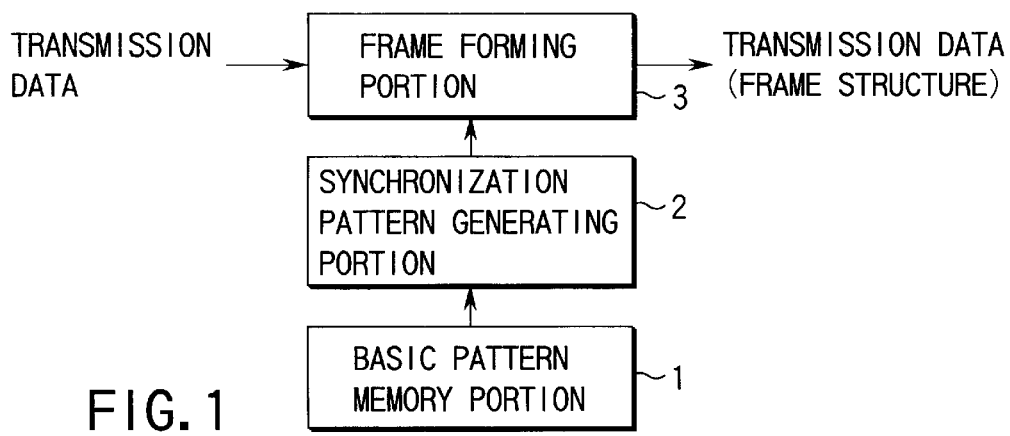
FIG. 1 is a block diagram showing a main structure of a transmission device in a digital communication system according to an embodiment of the present invention.

FIG. 1 is a block diagram showing the main structure of a transmission device in a digital communication system according to an embodiment of the present invention. It should be noted that an example of the application of this transmission device is a base station in a mobile communication system of a "wideband CDMA" (W-CDMA).

As can be seen in this figure, the transmission device has a basic pattern memory portion 1, a synchronization pattern generating portion 2 and a frame forming portion 3.

Figure 2:
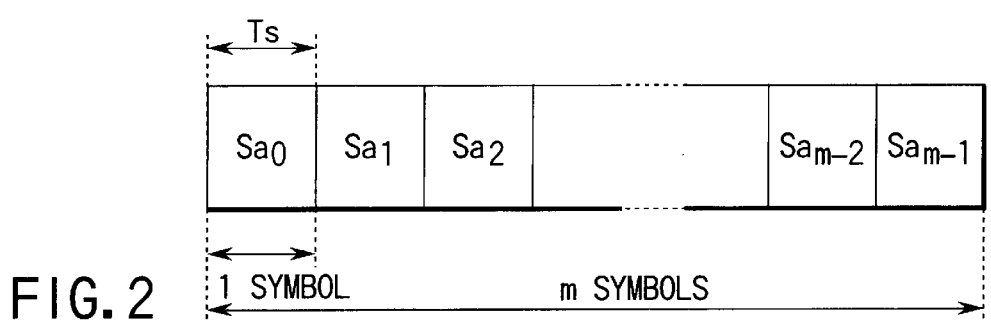
FIG. 2 is a diagram showing a structure of a basic pattern used in the embodiment of the present invention.

The basic pattern memory portion 1 is made of, for example, a ROM, and stores a basic pattern and a reversal basic pattern. The basic pattern consists of Ad an m number of symbols Sa ($Sa_0$ to $Sa_{m-1}$) each indicating "1" or "0" on logical description as shown in FIG. 2. As a basic pattern, a code row having a low auto-correlation, such as an orthogonal gold code, is used. A reversal basic pattern is that obtained by reversing the polarity of each symbol with respect to the basic pattern ($\pi$-rotation on an IQ plane).

The synchronization pattern generating portion 2 generates synchronization pattern by arranging basic patterns and reversal basic patterns stored in the basic pattern memory portion 1, according to a predetermined reversal pattern.

Figure 3:
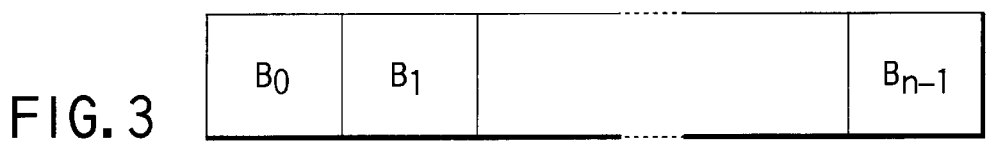
FIG. 3 is a diagram showing a structure of a basic pattern used in the embodiment of the present invention.

As shown in FIG. 3, the reversal pattern consists of an n-number of reversal data B ($B_0$ to $B_{n-1}$). The reversal data B indicates which one of basic pattern and reversal basic pattern is arranged. More specifically, the reversal data B is set to "1" at the position where the basic pattern is disposed, whereas it is set to "−1" at the position where the reversal basic pattern is disposed. That is, the reversal pattern indicates a structure of a synchronization pattern, which is a combination of the n-number of basic patterns and reversal basic pattern.

The frame forming portion 3 sectionalizes transmission data given for transmitting signals, by a predetermined time. Then, the frame forming portion 3 adds the synchronization pattern given from the synchronization pattern generating portion 2 to the transmission data for each predetermined time, thereby structuralizing the transmission data in frame.

Figure 4:
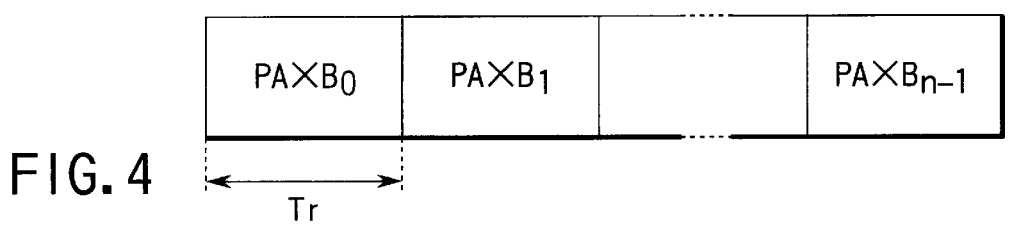
FIG. 4 is a diagram showing a structure of a synchronization pattern used in the embodiment of the present invention.

Thus, in the transmission device, the synchronization pattern generating portion 2 generates a synchronization pattern such as shown in FIG. 4, which is obtained by arranging the n-number of the basic patterns PA in arrangement and mathematically multiplying the reversal pattern to each basic pattern.

Figure 5:
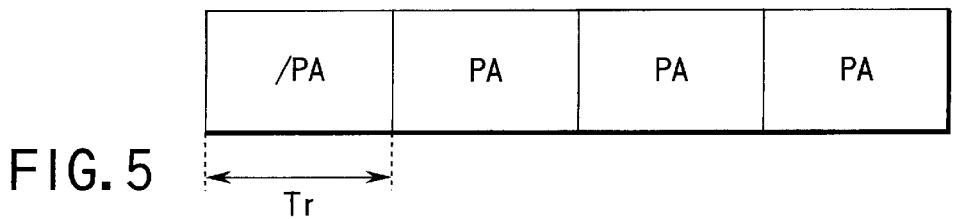
FIG. 5 is a diagram showing a specific example of the basic pattern used in the embodiment of the present invention.

Specifically, when n is set to "4", and the reversal pattern $\{B_0, B_1, B_2$ and $B_3\}$ is set to $\{-1, 1, 1, 1\}$, a synchronization pattern in which three basic patterns PA continues to follow one reversal basic pattern/PA, as shown in FIG. 5, is generated.

How such a synchronization pattern is generated will now be described in further detail with reference to FIG. 6.

Figure 6:
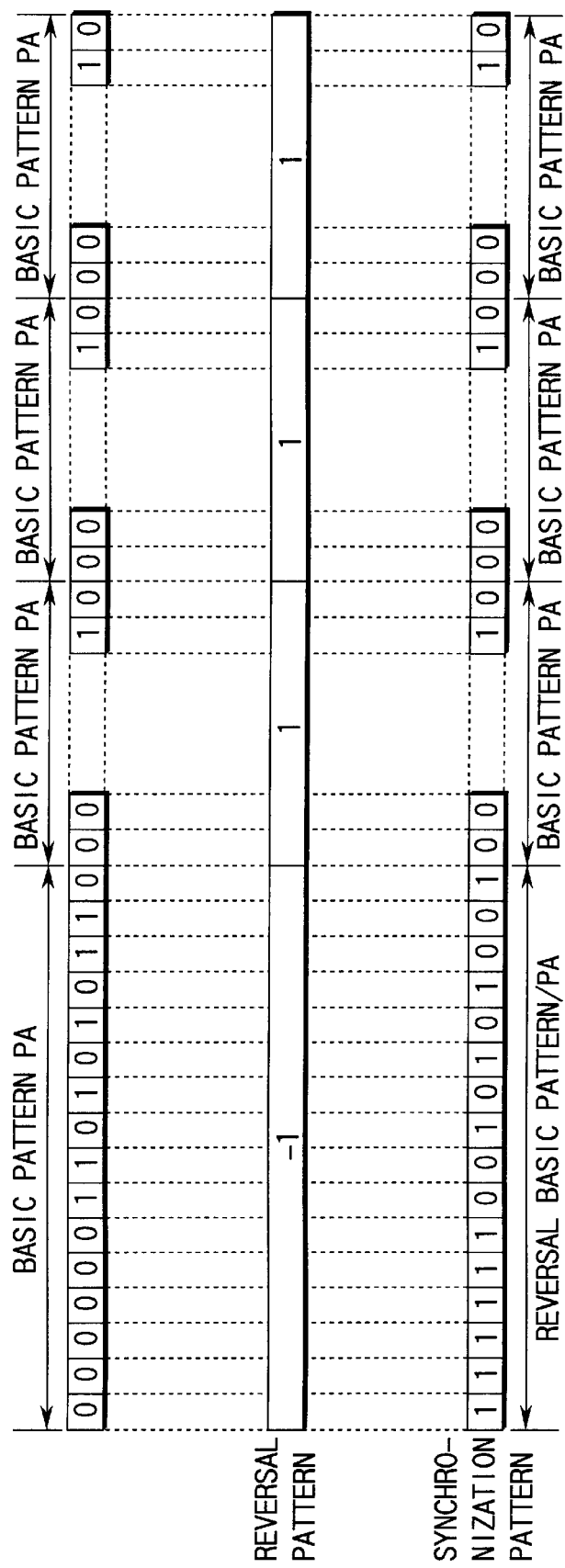
FIG. 6 is a diagram showing specifically how a synchronization pattern is created.

In the example shown in FIG. 6, the number of symbols in a basic pattern PA is set to "16", and its pattern is set to $\{0, 0, 0, 0, 0, 0, 1, 1, 0, 1, 0, 1, 0, 1, 1, 0\}$.

Meanwhile, in the example of FIG. 6, the number of symbols of a synchronization pattern is set to "64", but usually, there are "256" symbols. That is, when the basic pattern PA is set as the above-described pattern, the number n of repetition is set to "16". When the number n of repetition is set to "16", for example, a pattern of $\{1, 1, 1, -1, -1, 1, -1, -1, 1, 1, 1, -1, 1, -1, 1, 1\}$ can be applied.

However, in the description which will now be provided, a case where the number n of repetition is set to "4" and the reversal pattern is set to $\{-1, 1, 1, 1\}$, will be discussed in order to make the explanation simple.

It should be noted that the number of symbols of a synchronization pattern is set to "256", the number m of symbols of a basic pattern PA is "16", and the number n of repetition is set to "16", the basic pattern PA can be described as PA=$\{Sa_0, Sa_1, \ldots, Sa_{15}\}$, and the reversal pattern is described as $\{B_0, B_1, \ldots, B_{15}\}$. Thus, the synchronization pattern will be: $\{B_0 \times Sa_0, B_0 \times Sa_1, \ldots, B_0 \times Sa_{15}, B_1 \times Sa_0, B_1 \times Sa_1, \ldots, B_1 \times Sa_{15}, \ldots, B_{14} \times Sa_0, B_{14} \times Sa_1, \ldots, B_{14} \times Sa_{15}, B_{15} \times Sa_0, B_{15} \times Sa_1, \ldots, B_{15} \times Sa_{15}\}$.

With addition of such a synchronization pattern, transmission data having a frame structure is transmitted.

Figure 7:
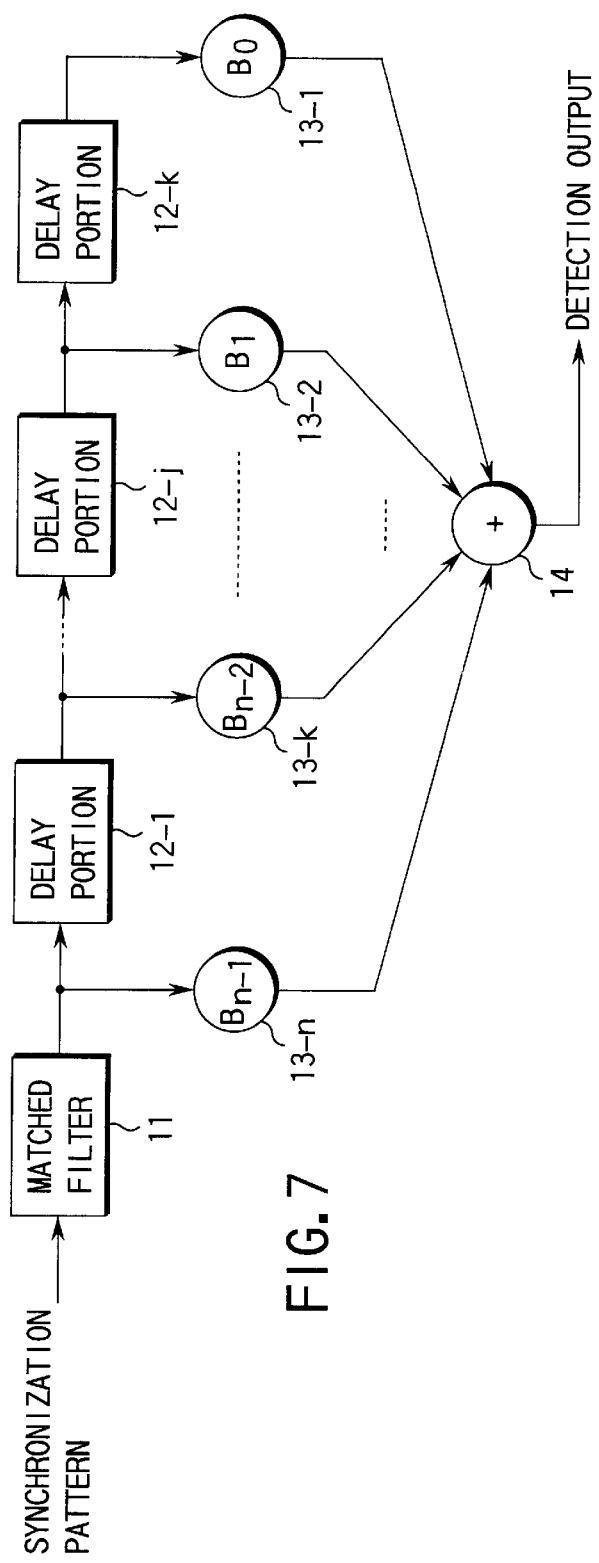
FIG. 7 is a diagram showing a structure of a frame synchronization detection circuit provided in a reception device in a digital communication system according to an embodiment of the present invention.
Figure 14:
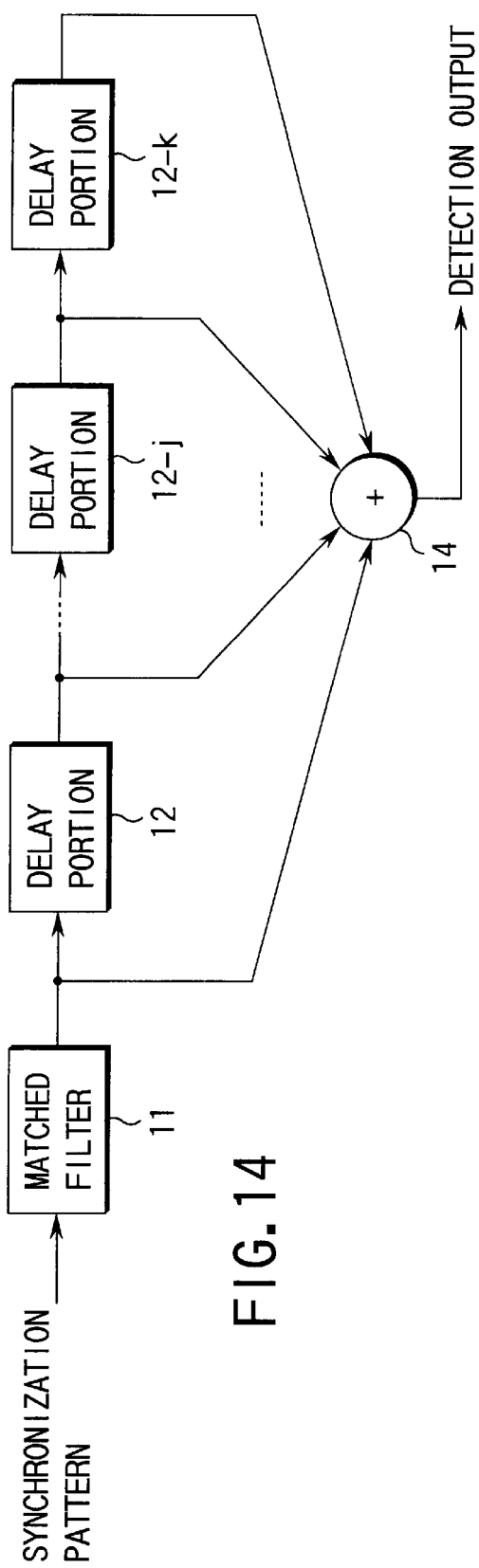
FIG. 14 is a block diagram showing a structure of a synchronization detection circuit for carrying out synchronization detection on the basis of the synchronization pattern shown in FIG. 13.
Figure 15:
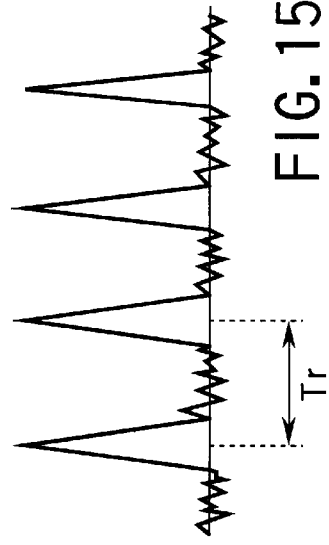
FIG. 15 is a diagram showing an example of a waveform of an output from the matched filter 11 shown in FIG. 14.
Figure 16:
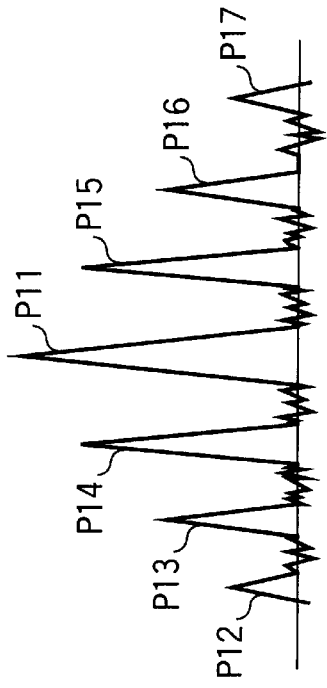
FIG. 16 is a diagram showing an example of a waveform of a detected output by the synchronization detection circuit shown in FIG. 14.

On the other hand, in the reception device in the digital communication system of this embodiment, a frame synchronization detection circuit having a structure shown in FIG. 7 is provided. It should be noted here that in FIG. 7, items similar to those of FIG. 14 are designated by the same reference numerals.

An example of the application of this reception device is a mobile station in a mobile communication system of a "wideband CDMA" (W-CDMA).

This frame synchronization detection circuit has a matched filter 11, a k-number (k=n−1) of delay portions 12 (12-1 to 12-k), an n-number of multipliers 13 (13-1 to 13-n) and an adder 14.

The matched filter 11 is designed to deal with a basic pattern PA. More specifically, the matched filter 11 includes an m-number, which is the same as the symbol number in the basic pattern PA, and the delay time between taps is the same as the symbol cycle. Further, as the tap coefficient, either one of "1" and "−1" is set to correspond to the basic pattern PA.

In the delay portions 12, delay portions 12-1, 12-2, ..., 12-j, and 12-k are connected in series in the mentioned order. To the delay portion 12-1 at the most front stage, an output from the matched filter 11 is given. Therefore, each delay portion 12 delays outputs from the matched filter one after another. It should be noted that the delay time of each delay portion 12 is set to a cycle period Tr of the basic pattern PA and reversal basic pattern/PA.

The multipliers 13, multipliers 13-k, ..., 13-2, 13-1, are connected in the mentioned order, to the delay portions 12-1 to 12-k, respectively. The multiplier 13-n is connected to an output of the matched filter 11. To these multipliers 13-1 to 13-n, $B_0$ to $B_{n-1}$ in the reversal pattern are set as tap coefficients respectively, and the tap coefficients are multiplied to inputs.

The adder 14 calculates out the total of the outputs from the multipliers 13-1 to 13-n, and the detection output of such a level that corresponds to the total thus calculated is outputted.

Thus, the delay portions 12, the multipliers 13 and the adder 14 constitute a matched filter which deals with the reversal pattern.

When a synchronization pattern created by the transmission device as described above is input to the frame synchronization detection circuit, a peak is generated in an output of the matched filter 11 every time basic patterns or reversal basic patterns match. Consequently, when a synchronization pattern is input one time, peaks in the same number as the number n of times of repetition are generated in the output from the matched filter 11.

It should be noted that a peak obtained when basic patterns match in the matched filter 11 and a peak obtained when reversal basic patterns match will have polarities opposite from each other.

Figure 8:
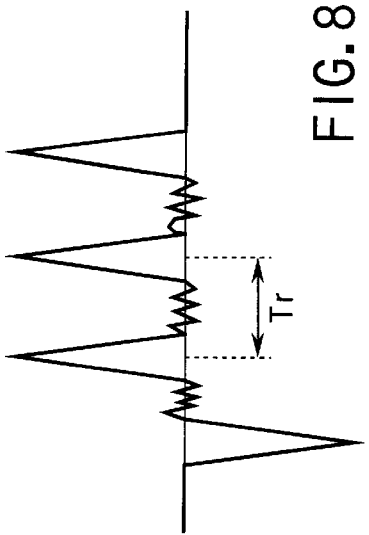
FIG. 8 is a diagram showing an example of a waveform of an output from a matched filter 11 shown in FIG. 7.

Therefore, an output from the matched filter 11 will have a waveform which has a peak generated to correspond to the reversal patterns. For example, when the number n of times of repetition is set to "4", and the reversal pattern is se to {−1, 1, 1, 1}, a waveform such as shown in FIG. 8 is obtained.

A signal output from the matched filter 11, that is, a signal which generates a peak to correspond to the reversal pattern, is correlated with the reversal pattern by the matched filter consisting of the delay portions 12, the multipliers 13 and the adder 14.

Thus, when the n-number of peaks in the output from the matched filter 11 match with each other in each tap of the matched filter consisting of the delay portions 12, the multipliers 13 and the adder 14, a peak is generated in a detection output.

In the detection output, a peak is generated at a position where the time axis deviates. However, as to this peak, part of the n-number of peaks in a signal output from the matched filter 11 has a reverse polarity at a stage where they are input top the adder 14, and therefore these peaks cancel out each other, to reduce the level.

Figure 9:
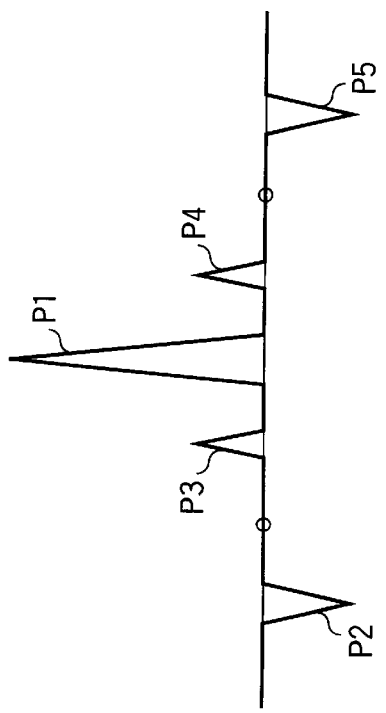
FIG. 9 is a diagram showing an example of a waveform of a detected output in a frame synchronization detection circuit shown in FIG. 7.
Figure 10:
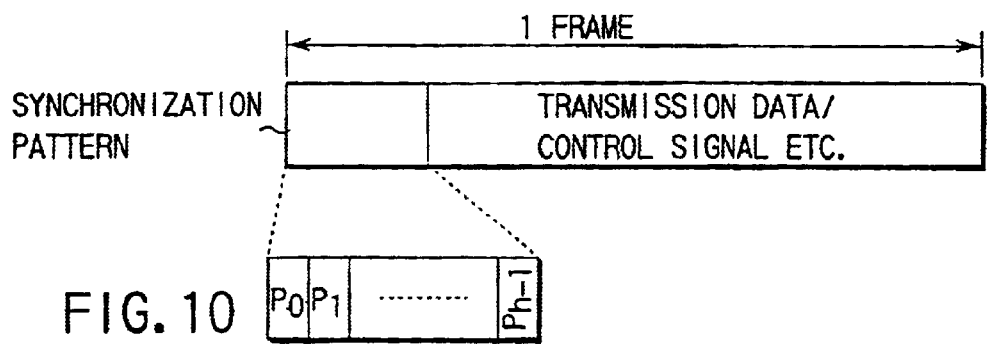
FIG. 10 is a diagram showing a prior art example of a frame structure of transmission data in the digital communication system.

As a result, when the number of times of repetition is set to "4", and the reversal pattern is set to {−1, 1, 1, 1}, the detection output will have a waveform as shown in FIG. 9. In this case, to an absolute value of peak P1 whose absolute value is at maximum, which indicates a real frame synchronization timing, an absolute value of peaks P2, P3, P4 and P5 whose levels are the second maximum absolute value becomes ¼.

Thus, the difference in level between the absolute value of a real peak to be detected and the absolute value of another peak is increased, and therefore the efficiency of the real peak detection, that is, the detection of the frame synchronization timing, is improved.

Further, the number of taps contained in the frame synchronization detection circuit in the embodiment is m+n, which can be made less than the number of symbols of the synchronization pattern, that is, m×n. As described above, the number of symbols of the basic pattern PA is set to "16" and the number of times of repetition is set to "16", the number of symbols in the synchronization pattern is "256", whereas the number of taps can be made "32" to be enough. Therefore, as compared to the case where a matched filter which deals with all of the synchronization pattern is used, the scale of the circuit and the consumption current can be reduced.

It should be noted that in the above-described example, with respect to the absolute value of peak whose absolute value is maximum, the absolute value of the peak whose level is the second maximum absolute value is ¼; however this can be changed depending upon the setting of the reversal pattern.

For example, when the reversal pattern is set to {1, −1, −1, 1}, with respect to the absolute value of peak whose absolute value is maximum, the absolute value of the peak whose level is the second maximum absolute value becomes ⅔, and thus the level difference is lowered.

Therefore, it is desirable that such an appropriate reversal pattern that can lower the absolute value of the peak whose absolute value is the second maximum as much as possible, should be selected.

Examples of the reversal pattern appropriate for the case where the number n of times of repetition is set to "4" are {−1, 1, 1, 1} and {1, −1, 1, 1}. Further, in the case where these appropriate reversal patterns are expressed by {−Ba, −Bb, −Bc, −Bd}, for example, {−Ba, −Bb, −Bc, −Bd}, which is a reverse thereof and {Bd, Bc, Bb, Ba}, in which the order is switched, are appropriate reversal pattern as well.

Such an appropriate reversal pattern can be selected by selecting a combination of By (y=0, 1, . . . , n−2, n−1), which makes the following formula minimum, $$\text{Max}\left\{\left|\sum_{y=0}^{n-1} B_y \cdot B_{y+1}\right| (i = 1, 2 \ldots, n-2)\right\}$$

when y+i≧n, $B_{y+i}$ 0.

Further, such an operation can be easily carried out by a $2^n$ number of times of trial.

It should be noted that the present invention is not limited to the above-described embodiment, but, for example, the generation of a synchronization pattern in a transmission device can be carried out by a logic circuit.

In the above embodiment, both the basic pattern and reversal basic pattern are stored in the basic pattern memory portion 1; however it is also possible that only the basic pattern is stored in the basic pattern memory portion 1 and a reversal basic pattern is formed by reversing its polarity.

In the above embodiment, each symbol of the synchronization pattern is in a binary data; however if it is in multi-value or complex value, the present invention can be applied.

Since the process carried out by the frame synchronization detection circuit of the embodiment is linear conversion of the order of the matched filter 11 and a matched filter consisting of the delay portions 12, the multipliers 13 and the adder 14 can be freely switched.

Further, in the above embodiment, the synchronization pattern is disposed at the top of a frame; however it is clear that, even if it is disposed at an arbitrary position other than the top determined in advance by the system, the above-described effect can be obtained.

Further, in the above embodiment, the matched filter 11 is designed to correspond to the entirety of the basic pattern; however it is also possible that only part of symbols of the basic pattern is focused as focus symbols, and the matched filter 11 is made to correspond to only the focus symbols.

Figure 11:
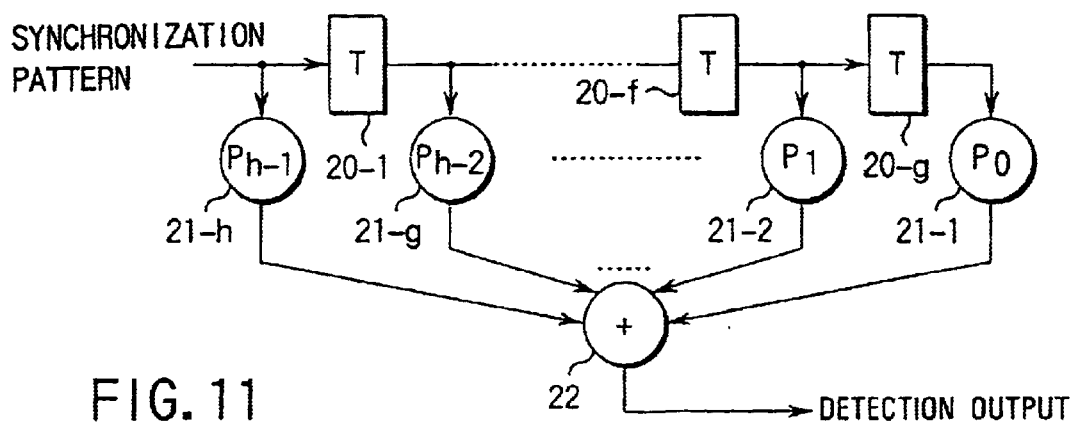
FIG. 11 is a diagram showing a general structure of a matched filter for frame synchronization detection.
Figure 12:
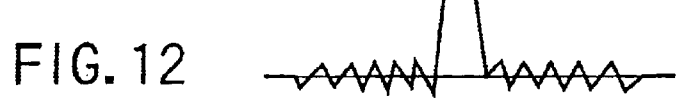
FIG. 12 is a diagram showing an example of a waveform of a detected output by the matched filter shown in FIG. 11.
Figure 13:
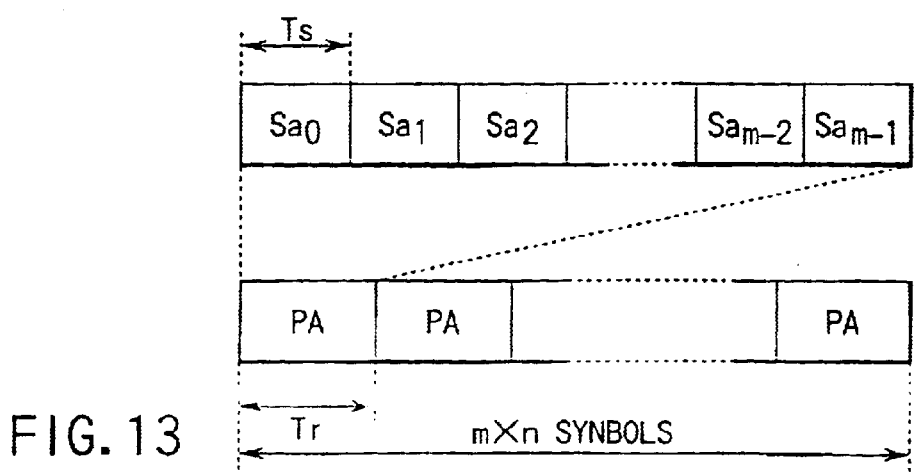
FIG. 13 is a diagram showing a structure of a synchronization pattern formed by repeating the basic pattern by an integer number of times.

A synchronization pattern transmitted by the transmission device of the embodiment can be detected by an ordinary frame synchronization detection circuit consisting of one matched filter as shown in FIG. 11. Even in this case, the matched filter shown in FIG. 11 is designed to correspond to the entirety of the basic pattern, or it is also possible that only part of symbols of the basic pattern is focused as focus symbols, and the matched filter shown in FIG. 11 is made to correspond to only the focus symbols.

Apart from the above, the present invention can be remodeled into various versions as long as the essence of the invention remains.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. A digital communication system, comprising:
a transmitting apparatus including
a pattern generator configured to generate a synchronizing pattern including at least one repetition of a first pattern of symbols and a second pattern of symbols having a reversed polarity from the first pattern, the synchronizing pattern arranged by a third pattern indicating positions and a number of repetitions of the first pattern and the second pattern,
a frame generator configured to generate at least one frame including data to be transmitted and the synchronizing pattern, and
a transmitter configured to transmit the at least one frame; and a receiving apparatus including
a receiver configured to receive the at least one frame,
a filter configured to filter the received at least one frame based on parts of the symbols in the first pattern and a period of time between each of the parts of the symbols, and
a detector configured to detect a plurality of values for identifying the at least one frame based on delaying the filtered at least one frame and the third pattern.

2. The digital communication system according to claim 1, wherein the number of repetitions indicated in the synchronizing pattern is an odd number.

3. The digital communication system according to claim 1, wherein the third pattern is selected based on the formula $$\text{Max}\left\{\left|\sum_{y=0}^{n-1} By \cdot By+i\right|\right\},$$

where n represents the number of repetitions indicated in the synchronizing pattern, where i=1, . . . , n−2, where y=0, . . . , n−1, where y+i≧n, where B represents a binary symbol, and where $B_{y+i}=0$.

4. The digital communication system according to claim 1, wherein the third pattern is {−1, 1, 1, 1}.

5. A digital communication system, comprising:
a transmitting apparatus including
a pattern generator configured to generate a synchronizing pattern including at least one repetition of a first pattern of symbols and a second pattern of symbols having a reversed polarity from the first pattern, the synchronizing pattern arranged by a third pattern indicating positions and a number of repetitions of the first pattern and the second pattern,
a frame generator configured to generate at least one frame including data to be transmitted and the synchronizing pattern, and
a transmitter configured to transmit the at least one frame; and a receiving apparatus including
a receiver configured to receive the at least one frame,
a filter configured to filter the received at least one frame based on the symbols in the first pattern and a period of time between each of the symbols, and
a detector configured to detect a plurality of values for identifying the received at least one frame based on delaying the filtered at least one frame and the third pattern.

6. The digital communication system according to claim 5, wherein the number of repetitions indicated in the synchronizing pattern is an odd number.

7. The digital communication system according to claim 5, wherein the third pattern is selected based on the formula $$\text{Max}\left\{\left|\sum_{y=0}^{n-1} By \cdot By+i\right|\right\},$$

where n represents the number of repetitions indicated in the synchronizing pattern, where i=1, . . . , n−2, where y=0, . . . , n−1, where y+i≧n, where B represents a binary symbol, and where $B_{y+i}=0$.

8. The digital communication system according to claim 5, wherein the third pattern is {−1, 1, 1, 1}.

9. A digital communication system, comprising:
a transmitting apparatus including
a pattern generator configured to generate a synchronizing pattern including at least one repetition of a first pattern of symbols and a second pattern of symbols having a reversed polarity from the first pattern, the synchronizing pattern arranged by a third pattern indicating positions and a number of repetitions of the first pattern and the second pattern,
a frame generator configured to generate at least one frame including data to be transmitted and the synchronizing pattern, and
a transmitter configured to transmit the at least one frame; and a receiving apparatus including
a receiver configured to receive the at least one frame, and
a detector configured to detect a plurality of values for identifying the received at least one frame based on parts of symbols in the synchronizing pattern and a period of time between each of the parts of symbols.

10. The digital communication system according to claim 9, wherein the number of repetitions indicated in the synchronizing pattern is an odd number.

11. The digital communication system according to claim 9, wherein the third pattern is selected based on the formula $$\text{Max}\left\{\left|\sum_{y=0}^{n-1} By \cdot By+i\right|\right\},$$

where n represents the number of repetitions indicated in the synchronizing pattern, where i=1, . . . , n−2, where y=0, . . . , n−1, where y+i≧n, where B represents a binary symbol, and where $B_{y+i}=0$.

12. The digital communication system according to claim 9, wherein the third pattern is {−1, 1, 1, 1}.

13. A digital communication system, comprising:
a transmitting apparatus including
a pattern generator configured to generate a synchronizing pattern including at least one repetition of a first pattern of symbols and a second pattern of symbols having a reversed polarity from the first pattern, the synchronizing pattern arranged by a third pattern indicating positions and a number of repetitions of the first pattern and the second pattern,
a frame generator configured to generate at least one frame including data to be transmitted and the synchronizing pattern, and
a transmitter configured to transmit the at least one frame; and a receiving apparatus including a receiver configured to receive the at least one frame, and a detector configured to detect a plurality of values for identifying the received at least one frame based on symbols in the synchronizing pattern and a period of time between each of symbols.

14. The digital communication system according to claim 13, wherein the number of repetitions indicated in the synchronizing pattern is an odd number.

15. The digital communication system according to claim 13, wherein the third pattern is selected based on the formula $$\text{Max}\left\{\left|\sum_{y=0}^{n-1} By \cdot By + i\right|\right\},$$

where n represents the number of repetitions indicated in the synchronizing pattern, where i=1, ..., n−2, where y=0, ..., n−1, where y+i≧n, where B represents a binary symbol, and where $B_{y+i}=0$.

16. The digital communication system according to claim 13, wherein the third pattern is {−1, 1, 1, 1}.

17. A communication apparatus for transmitting a frame, the apparatus comprising:

a memory configured to store a first pattern of symbols and a second pattern of symbols having a reversed polarity from the first pattern;

a pattern generator configured to generate a synchronizing pattern including at least one repetition of the first pattern and the second pattern, the synchronizing pattern arranged by a third pattern indicating positions and a number of repetitions of the first pattern and the second pattern;

a frame generator configured to generate the frame including data to be transmitted and the third pattern; and a transmitter configured to transmit the frame.

18. The communication apparatus according to claim 17, wherein the number of repetitions indicated in the synchronizing pattern is an odd number.

19. The communication apparatus according to claim 17, wherein the third pattern is selected based on the formula $$\text{Max}\left\{\left|\sum_{y=0}^{n-1} By \cdot By + i\right|\right\},$$

where n represents the number of repetitions indicated in the synchronizing pattern, where i=1, ..., n−2, where y=0, ..., n−1, where y+i≧n, where B represents a binary symbol, and where $B_{y+i}=0$.

20. The communication apparatus according to claim 17, wherein the third pattern is {−1, 1, 1, 1}.

21. A method of transmitting a frame having a first pattern of symbols and a second pattern of symbols having a reversed polarity from the first pattern, the method comprising:

generating a synchronizing pattern including at least one repetition of the first pattern and the second pattern, the synchronizing pattern arranged by a third pattern indicating positions and a number of repetitions of the first pattern and the second pattern;

generating a frame including data to be transmitted and the third pattern; and transmitting the frame.

22. The method according to claim 21, wherein the number of repetitions indicated in the synchronizing pattern is an odd number.

23. The method according to claim 21, wherein the third pattern is selected based on the formula $$\text{Max}\left\{\left|\sum_{y=0}^{n-1} By \cdot By + i\right|\right\},$$

where n represents the number of repetitions indicated in the synchronizing pattern, where i=1, ..., n−2, where y+i≧n, where B represents a binary symbol, and where $B_{y+i}=0$.

24. The method according to claim 21, wherein the third pattern is {−1, 1, 1, 1}.

25. A communication apparatus for receiving at least one frame, the at least one frame including data and a synchronizing pattern including at least one repetition of a first pattern of symbols and a second pattern of symbols having a reversed polarity from the first pattern, the synchronizing pattern arranged by a third pattern indicating positions and a number of repetitions of the first pattern and the second pattern, the apparatus comprising:

a filter configured to filter a received signal based on parts of symbols in the first pattern and a period of time between each of the parts of the symbols;

a detector configured to detect a plurality of values for identifying the at least one frame in the received signal based on delaying the filtered received signal and the third pattern.

26. A communication apparatus for receiving at least one frame, the at least one frame including data and a synchronizing pattern, the synchronizing pattern including at least one repetition of a first pattern of symbols and a second pattern of symbols having a reversed polarity from the first pattern, the synchronizing pattern arranged by a third pattern indicating a position and a number of repetitions of the first pattern and the second pattern, the apparatus comprising:

a filter configured to filter a received signal based on symbols in the first pattern and a period of time between each of the symbols;

a detector configured to detect a plurality of values for identifying the at least one frame in the received signal based on delaying the filtered received signal and the third pattern.

27. A method of receiving at least one frame, the at least one frame including data and a synchronizing pattern, the synchronizing pattern including at least one repetition of a first pattern of symbols and a second pattern of symbols having a reversed polarity from the first pattern, the synchronizing pattern arranged by a third pattern indicating positions and a number of repetitions of the first pattern and the second pattern, the method comprising:

filtering the received signal based on a part of symbols in the first pattern of symbols and a period of time between each part of the symbols;

detecting a plurality of values for identifying a frame to be received based on delaying the filtered frame and the third pattern.

28. A method of receiving at least one frame, the at least one frame including data and a synchronizing pattern, the synchronization pattern including at least one repetition of a first pattern of symbols and a second pattern of symbols having a reversed polarity from the first pattern, the synchronizing pattern arranged by a third pattern indicating positions and a number of repetitions of the first pattern and the second pattern, the method comprising:

filtering a received signal based on symbols in the first pattern and a period of time between each of the symbols;

detecting a plurality of values for identifying the at least one frame in the received signal based on delaying the filtered received signal and the third pattern.

29. A receiver for receiving at least one frame, the at least one frame including data and a synchronizing pattern, the synchronizing pattern including at least one repetition of a first pattern of symbols and a second pattern of symbols having a reversed polarity from the first pattern, the synchronizing pattern arranged by a third pattern indicating positions and a number of repetitions of the first pattern and the second pattern, the receiver comprising;
- a filter configured to filter a received signal based on parts of symbols in the first pattern and a period of time between each of the parts of the symbols;
- a detector configured to detect a plurality of values for identifying the at least one frame in the received signal based on delaying the filtered received signal and the third pattern.

30. A receiver for receiving at least one frame, the frame including data and a synchronizing pattern, the synchronizing pattern including at least one repetition of a first pattern of symbols and a second pattern of symbols having a reversed polarity from the first pattern, the synchronizing pattern arranged by a third pattern indicating positions and a number of repetitions of the first pattern and the second pattern, the receiver comprising;
- a filter configured to filter a received signal based on symbols in the first pattern and a period of time between each of the symbols;
- a detector configured to detect a plurality of values for identifying the at least one frame in the received signal based on delaying the filtered received signal and the third pattern.

* * * * *